United States Patent [19]

Bass

[11] 3,983,255

[45] Sept. 28, 1976

[54] PREPARATION OF FERTILIZER AND ANIMAL FEED FROM MOLASSES FERMENTATION RESIDUE

[75] Inventor: Henry Herschel Bass, Potts Point, Australia

[73] Assignee: Unisearch Limited, Kensington, Australia

[22] Filed: Sept. 20, 1974

[21] Appl. No.: 507,703

[30] Foreign Application Priority Data

Oct. 2, 1973 Australia............................ 5063/73

[52] U.S. Cl..................................... 426/54; 71/23; 426/443; 426/573; 426/635; 426/807
[51] Int. Cl.²...................... C05F 11/00; A23K 1/02
[58] Field of Search .............................. 426/71–73, 426/210, 213, 342, 443, 465, 520, 69, 573, 807, 48, 623, 624, 658, 635, 54; 71/23

[56] References Cited

UNITED STATES PATENTS

| | | | |
|---|---|---|---|
| 1,799,176 | 4/1931 | Metzl | 71/23 |
| 2,560,830 | 7/1951 | Turner | 426/71 |
| 3,325,289 | 6/1967 | Lyons | 426/210 |
| 3,600,189 | 8/1971 | Raynal | 426/213 |

*Primary Examiner*—David M. Naff
*Assistant Examiner*—C. A. Fan
*Attorney, Agent, or Firm*—Richards, Harris, and Medlock

[57] ABSTRACT

A molasses fermentation residue is converted into a coagulation product to use in preparing animal feed or fertilizer by concentrating a molasses fermentation residue to a solids level of at least 60 percent, heating the residue to about its boiling point and cooling, adding a soluble phosphate to the cooled residue and coagulating the residue-phosphate mixture by heating at about 105° to 120°C.

7 Claims, No Drawings

PREPARATION OF FERTILIZER AND ANIMAL FEED FROM MOLASSES FERMENTATION RESIDUE

This invention relates to the treatment, and effective utilisation, of materials which would otherwise be regarded as waste. In particular, the invention finds application in the treatment of molasses fermentation residues, so as to produce therefrom products in the nature of organic fertilisers and/or animal feed supplements. The final product in each case can be easily ground to powder or granular form for ease in handling, bagging, transport and marketing.

Molasses, a by-product of sugar manufacture from sugar beet or sugar cane, is a thick brown syrup containing about 50 percent residual sugar. It is produced in many parts of the world — and finds one of its principal uses as the raw material for the manufacture of industrial alcohol, methylated spirits, and rum. In the production of alcohol or rum (by fermentation of the molasses in accordance with conventional procedures), the residual sugar is converted into alcohol (and carbon dioxide gas) while the remaining liquid (known in the art as "wort" or "beer") is subsequently distilled to recover the required product. The fermentation residue or effluent — known commercially as slop, vinasses or dunder, (but hereafter simply called slop for reasons of convenience.) — is almost invariably run to waste.

It will be appreciated that such disposal of the slop by virtue of the invariable location of molasses fermentation plants in the industrial centers of big cities — brings with it a not-inconsiderable pollution problem.

The nuisance value of molasses distillery effluent or residues was well recognised at the beginning of this century, when the only solution appeared to be complete incineration of the distillery output, and when a French designed incinerator — called the Porion oven — was first used. The Porion oven produced a blackened ash rich in Potash, which is one of the principle fertilising elements in the effluent. A description of the Porion oven is given by William L. Owen in "Facts about Sugar," June 1938, pps 45–48 in a general article entitled "The Utilisation of Distillery Slop."

To this day, incineration of the slop, with the complete loss of the valuable organic matter, is practiced to avoid pollution problems; in fact, the latest use of this idea is the installation in 1973 by an internationally known rum distiller in Nassau, in the Bahamas, of the most sophisticated type of incinerator utilising the modern fluid bed techniques. See, for example, U.S. Pat. Nos. 3,309,262 and 3,462,246.

Another method of overcoming — or at least considerably alleviating — the problem of disposal of distillery effluent is to concentrate the effluent and recover the solids contained therein.

The molasses fermentation residues contain up to 10 percent of solids, and to evaporate this to a thick liquid of the consistency of molasses, is a difficult enough task. The conversion of this concentrated residue into a useful friable non hygroscopic solid, capable of being granulated or ground into a powder, is another matter, because the usual result of trying to obtain the solid matter from the molasses fermentation residue is a product which is a hygroscopic glue like substance which is extremely difficult to handle and is of little use.

Numerous patent specifications describe preparation of animal feeds from molasses, especially feed blocks suitable as lick blocks, but none relate to use of molasses fermentation residues. See in particular U.S. Pat. No. 3,246,336 which describes preparation of molasses feed blocks from dehydrated molasses. This patent also refers to earlier U.S. Patents for preparation of dehydrated molasses, in particular U.S. Pat. Nos. 2,912,331; 2,377,360; 2,991,179 and 2,556,111.

However, obtaining a stable friable and non-hygroscopic solid from molasses fermentation residues having some commercial value is a different proposition to obtaining useful products from molasses itself.

In my Australian Pat. of 1928 No. 12,453/28, hot concentrated effluent was mixed with phosphate rock and concentrated sulphuric acid, which has the effect of altering the hygroscopic nature of the otherwise difficult to dry material, and results in a material which is friable, is easily ground, is non-hygroscopic and could be sold as a fertiliser. However, it was found that adding concentrated sulphuric acid in relatively large amounts, of up to 25 percent, to a hot liquid was a hazardous step in the process, as this causes the liquid to boil and splash acid around in a manner dangerous to the operator. Since this was an essential step of the process, it was abandoned for this reason.

According to a later U.S. Pat. by Zdenko Metzl, No. 1,799,176 of 1931, there was obtained a dry and non-hygroscopic fertiliser from distillery residues using equal weights of distillery residue and superphosphate. It seems from this Patent that unconcentrated distillery residue was used. Further, such large proportions of superphosphate would result in a completely unbalanced fertiliser, rich only in Phosphorus, and would suffer the economic disability of virtually double handling, as well as processing, of vast quantities of superphosphate, equal in amount to the production of distillery residue. In my present invention, as little as 4 percent of triple superphosphate is used in the process and the economics is accordingly vastly different, as is also the nature of the final product.

As far as is known to me, only one manufacturer (in South Africa) has managed to obtain a powdered product from concentrated molasses fermentation residues, and this was achieved by the use of very elaborate and sophisticated spray driers. Such equipment is expensive both to purchase and to operate, and the product obtained from this form of drying is relatively very expensive. Further, because of the hygroscopic nature of the product, there are problems in bagging and mixing it with other animal feeds.

The purpose of my invention, however is to make a friable non-hygroscopic solid which can be granulated or ground into powder form, which is suitable for use as or in animal feed supplements and organic fertilisers, such friable non hygroscopic solid being obtained by coagulating the solids in concentrated molasses fermentation residues and drying the product as required. It is a relatively simple operation to dry the coagulated product compared with spray drying of the untreated liquid residue.

It is among the objects of the invention to provide a method whereby the problem of disposing of molasses fermentation effluent is overcome — or at least considerably alleviated. Concomitantly therewith, the invention proposes an efficacious usage of such waste material whereby — by virtue of the invention — a valuable product is efficiently and economically manufactured therefrom.

In one broad aspect, the invention provides a process for the manufacture of a product, adapted for use as, or incorporation in, an organic fertiliser and/or animal feed supplement, which comprises the sequential steps of concentrating molasses fermentation residues (slop) to a predetermined level, coagulating the concentrated slop by heating with phosphoric acid or derivatives of phosphoric acid, and drying the thus-treated material. The coagulating, congealing or gelling action, produced by treating with phosphoric acid or its derivatives, is the prime essential in the process; without this, any attempt to dry the concentrated slop will only result in a thick, sticky glue-like material which is extremely difficult to handle. In another broad aspect, the invention contemplates a friable non-hygroscopic powdered product manufactured in accordance with the process. Independently, the invention also includes within its ambit particular novel step(s) of the said process - such as a specific treatment of the concentrated slop. In a still further variation thereof - referable particularly to the animal feed supplement aspect of the invention - the abovementioned drying step may (if required) be eliminated, by producing a semi-solid block as an animal feed lick.

Desirably the slop may be concentrated to a 60–80 degrees Brix (about 60–80 percent of solids content) - which, in practice means that it is usually concentrated 6–8 times, from its original (low) solids level, so as to produce a thick viscous liquid material. As coagulants there are specifically mentioned the various superphosphates known commercially by the designations "single," "double" and "triple" superphosphate, phosphoric acid and commercial Ammonium Phosphates - which additives have an appreciable thickening action (apparently coagulatory) whereby the material takes on a paste or dough-like consistency, and is thereby rendered suitable for drying. Quantity-wise the amount of additive usually depends both upon the particular one chosen, and on the solids level of the concentrated slop; for instance, when the slop is concentrated to a 75–80 percent solids level, low percentages of additive (of the order of 3–5 percent) can be employed. Typical proportions of additives to concentrated slop (W/W) are 12 percent (single superphosphate), 5 percent (double superphosphate), 4 percent (triple superphosphate), 3 percent (phosphoric acid) and 5 percent (Monoammonium Phosphate).

Treatment is usually carried out at elevated temperatures, the concentrated slop being heated at atmospheric pressure to, or near, its boiling point, whereupon the selected additive(s) is (are) stirred into the concentrated slop. Drying may be effected conventionally - and at a temperature found to be suitable therefor. From an overall aspect, the process of the invention is such as to lend itself to either batch-wise or continuous operation.

Hereinbefore reference was made to a specific (novel) treatment of the concentrated slop. The materials in question (whereby such slop is coagulated to produce the thickened readily driable product) may include phosphoric acid, the various superphosphates and other suitable phosphatic materials, the treatment step ensuring that the product, when dried, has the friable et al properties attributed thereto (rather than being a sticky difficult-to-handle glue-like substance).

If desired additional supplements, aimed at augmenting the value of the product (as a fertiliser and/or animal feed supplement) may be incorporated - for example following the above specified treatment. When used as an animal feed, such additional supplements include urea, peanut husks, sorghum and other cereals, bagasse and other appropriate materials. When made into an organic fertiliser additional supplements could be ammonium sulphate, ammonium nitrate or other desirable plant nutrients. When the aim is to provide an animal feed supplement it is possible (as indicated above) to eliminate or modify, the step of drying, unless a powdered or granular form is required in which case it is dried and ground or granulated as for the fertiliser product.

The invention will now be described in greater detail with reference to certain specific examples thereof. It will be appreciated that such ensuing description is by way of illustration only and hence should not be construed in any limiting sense.

The following table conveniently presents features of the examples in tabular form.

| Example | Percentage solids in concentrated slop | Additive and proportion thereof W/W | |
|---|---|---|---|
| 1 | 65 | Single superphosphate | 15% |
| 2 | 76 | Double superphosphate | 5% |
| 3 | 76 | Triple superphosphate | 4% |
| 4 | 65 | Phosphoric Acid | 3% |
| 5 | 76 | Monoammonium Phosphate | 5% |

Above are the minimum amounts found necessary to bring about the desired congealing reaction. More of course may be added if desired.

The method of carrying out the process in the above examples was as follows.

EXAMPLE 1

100 parts of concentrated slop 65 percent solids added in a steam jacketed vessel provided with a thermometer and a mechanical stirrer is heated up quickly with stirring just short of starting to boil. The size of this vessel is chosen so that the slop no more than half fills it so as to allow for a head of froth which forms when reaching the boiling point. In this case the temperature reached 106°C with the formation of a small head of froth at which stage the steam was turned off whilst continuing stirring and the froth subsided very quickly and a small amount of thickening resulted from this first heating.

With continued stirring, the temperature was quickly dropped to 80°C, at which stage 15 parts of single superphosphate (preferably fine ground) were added and thoroughly incorporated by stirring, the mixture was then again quickly heated to near boiling point with stirring, this time it reached 106°C. Throughout the second heating the mixture gradually thickened and more suddenly at 106°C the whole mass started to gel when the steam was again turned off and the hot semi liquid mixture was poured into trays for drying. (Any other conventional method could of course be used which is applicable for drying the semi plastic solid obtained when the thickened liquid cools).

Some 35 percent of water has to be dried out of this semi plastic material which lends itself easily to be machine formed into spagetti like form suitable for conventional tunnel dryers for quick continuous drying. The final product which dries easily to only ½ percent water is extremely friable, so much so that crushing say in a meat mincer with very little power easily breaks it up into a dark brown powder with a pleasing appearance and a "good rich odour".

EXAMPLE 2

Using 5 percent double superphosphate. This material contains 17.5 percent phosphorus as against 9.3 percent for single superphosphate - hence less is required as a minimum to bring about the desired process reaction.

(Methods used same as in Example No. 1)

Temperatures observed in this case were - mixtures starts thickening at 95°C starts boiling at 105°C but reached 110°C after main reaction of gelling.

EXAMPLE 3

Using 4 percent triple superphosphate (this contains 19.5 percent phosphorus). Methods as before.

This time the maximum temperature reached was 110°C. In examples 2 and 3 a thicker concentrated slop (76 percent solids) was used and this also reduces the amount of congealing agent required.

EXAMPLES 4

(Method used as in Examples 1)

With 3 percent phosphoric acid and 65 percent solids dunder phosphoric acid itself is the most expensive form of phosphorus compound to use but since it can be made to a high degree of purity suitable for human and animal consumption final product is intended to be used as an animal feed supplement. 88 percent commercial phosphoric acid was used and the maximum temperature of the reaction was 105°C. The final dried product was found to have quite a pleasant odour and taste. The liquid product (before drying) thickens up sufficiently when cold to be used for animal feed blocks, or it could be dried and ground for marketing in granulated or powdered form.

EXAMPLE 5

(Method used as in Example 1)

Using 5 percent commercial mono ammonium phosphate (also known as M.A.P.) For use in animal feeds. Maximum temperature during the reaction was as high as 119°C and the resulting product was the most stiff of the five examples enumerated herewith. This makes it eminenantly suitable for animal feed blocks without any further drying.

If however, it is desired to make a dry powdered or granular form the above product dries into a very friable solid which is easily ground to a fine powder which has quite an attractive appearance and pleasing odour.

The process may be varied by first making a solution by boiling the M.A.P. amount required in a very small amount of water. M.A.P. is extremely soluble in hot water and for the 5 parts of M.A.P. in the above example as little as 3 parts of boiling water is required. The benefit of solubilising the active component of M.A.P. is to obtain a stronger coagulating or congealing reaction in the process - addition of water is of course generally undesirable in any thickening up process but in this case the stronger reaction yields a thicker product which is generally beneficial whether used to make animal feed blocks or whether dried for subsequent granulation or powdering for marketing as an animal feed supplement.

Another variation of this example is the incorporation of common salt with or without a small fat addition which is a common practice in making animal feed licks. In this case the process was carried under the following conditions in one example 100 parts of 77 Brix concentrated slop. First heating reached 120°C. When froth subsides mixed in 5 parts of common salt. When temperature drops to 90°C added 5 parts M.A.P. boiling in 3 parts of water. In this case an instant "gelling" took place and the thickening proceeded progressively until the maximum temperature of 120°C was reached when the heating was stopped. The thick hot liquid then sets into moulds as solid blocks when cool.

An example of the application of the liquid products obtained in examples 3 and 4 is their incorporation in animal feed mixes as a substitute for molasses. In fact it could be said that as far as trace elements and assimilable iron is concerned the concentrated dunder has approximately four times the concentration of these valuable ingredients and in this regard is an improvement upon molasses. One of the advantages of adding molasses to high cellulose content animal feeds such as baggase is that it is an excellent nutrient medium for rumen bacteria which "digest" the fibrous matter into an assimilable form for ruminants.

Concentrated slop is equally valuable as a nutrient for rumen bacteria and has a much higher content of the trace elements Manganese, copper, cobalt and zinc, also organic matter which is as much as 60 percent with a high proportion of sugars simple organic acids and about 10 percent of crude protein all of which are excellent for promoting rumen bacteria growth.

The incorporation of molasses into mixed feeds with grains, cereals, flour millers by products, sorghum and cellulosic materials etc is well established in many countries. The stickiness of molasses however limits the amount which can be incorporated into such mixed feeds and usually does not exceed about 10 percent.

With the products however in examples 4 and 5 there would be less stickiness when incorporating the thickened reacted concentrated slop, and of course when adding the powdered or granulated dried product such problems are overcome. The products do not have a high nitrogen content (about 1 percent) and if it is desired to increase this urea or other forms of assimilable nitrogen may be incorporated during the slop processing reaction.

The following examples a) and b) provide details of analysis of organic fertilisers and animal feed supplements produced in accordance with the invention.

a. ORGANIC FERTILISERS

One analysis of the dried untreated slop is as follows: Total sugars 7.4 percent, total ash 34.4 percent, potash 15 percent, crude protein 10 percent, phosphorus as $P_2O_5$ 0.4 percent, copper 22ppm, Iron 1500 ppm, zinc 100ppm. It will be seen from the above that the product is by no means a complete fertiliser - it is much too low in nitrogen and phosphorus, although it may have adequate potash, and of course the deficiencies could be made up by incorporating the appropriate chemical fertilisers such as ammonium sulphate and by adding more superphosphate in the reaction.

It is not however the object of this invention to make a complete fertiliser i.e., a complete chemical fertiliser, but rather a natural organic fertiliser which can be used in conjunction with other fertilisers where necessary. For example, blood and bone, a well favoured organic fertiliser, is quite deficient in potash but the organic matter is considered to be beneficial in promoting soil bacteria growth and it act as a soil conditioner.

Similarly the dried slop with an ash content of 34.4 percent or 65.5 percent organic matter would yield a product containing about 60 percent organic matter, and in much the same way as this is valuable as shown herebefore for animal rumen bacteria, it is equally so for soil bacteria; earthworms etc, and would act generally as a soil conditioner, and of course, it could be used in conjunction with any chemical fertiliser according to varying soil requirements.

Preliminary small scale experiments with this product, have already shown that in garden vegetables crops where complete chemical fertilisers are used, there is always a marked improvement in yield where in addition this new organic fertiliser is added.

The question of whether to make fertiliser or animal feed from slop would depend upon whether the local sewerage authorities require the whole of the effluent to be diverted. In this case, it would depend upon the size of the market for both products and as fertiliser demand far exceeds animal feeds in tonnage it would seem that although the commercial value of animal feeds is much higher, to dispose of the whole of a distillery's effluent the bulk would have to be made into fertiliser, although of course the animal feed could be made in the same plant. This applies particularly to large urban distilling plants turning out effluent around a million gallons or more per week.

b. ANIMAL FEED SUPPLEMENTS PERMISSIBLE FLUORINE CONTENT (see table following F.A.O. figures for dairy cows, beef cattle and sheep)

Since the basis of this invention is the use of phosphatic materials in the thickening process, consideration must be given to the fluorine content of these materials since they are all made from natural phosphate rock which itself has a high fluorine content (around 4 percent). During the process of manufacture of superphosphate in which phosphate rock is treated with sulphuric acid by what is known as the "wet process," some of the fluorine is given off as a volatile compound but a good proportion remains in the gypsum or calcium sulphate which is the insoluble portion of superphosphate. With further processing to make first double superphosphate and then triple superphosphate more and then more of the gypsum is removed and the fluorine content is progressively reduced and finally with mono ammonium phosphate it is only a fraction of the original figure for rock phosphate.

The following are the results of chemical analyses for fluorine made of some of the phosphatic materials used in this process and of some of the final products made by one invention as well as of the original concentrated slop prior to treatment by the process.

Table 1

| | % Fluorine |
|---|---|
| Commercial Mono Ammonium Phosphate M.A.P. | 0.220 |
| Water soluble portion of M.A.P. | 0.135 |
| Triple Superphosphate | 1.650 |
| Water soluble portion of triple Superphosphate | 0.305 |

The matter of great interest revealed by these analyses is that with the less expensive form of phosphorus i.e. Triple superphosphate the fluorine content could be reduced to 1/5 by merely using say a concentrated boiling solution and discarding the sludge of calcium sulphate.

Table 2

| | Parts per million of Fluorine |
|---|---|
| Concentrated slop 77 Brix untreated | 8.5 |
| 77 Brix slop 10% salt 2% fat (thickened) 5% M.A.P. | 100 |
| 63 Brix slop 5% M.A.P. 10% Salt 2% Fat (thickened) | 106 |
| 77 Brix slop 5% M.A.P. only (thickened) | 130 |
| 77 Brix slop 5% M.A.P. dried powder | 135 |
| 77 Brix slop 4% triple superphosphate | 448 |

It could be safely assumed from the results of Table that the cheaper triple superphosphate soluble portion could yield a product by this process of only around 90 parts per million.

In the state of New South Wales, Australia, the Government Stock Foods Act prescribes the following maximum amounts of fluorine permissible in stock food.

Table 3

| | Parts per million Fluorine |
|---|---|
| Dairy calves | 120 |
| Adult Dairy cattle | 400 |
| Sheep | 200 |
| Pigs | 100 |
| Poultry | 350 |

From these figures it can be claimed that the feed supplements made by this invention would be satisfactory as regards fluorine content and this would apply to most countries since the United Nations Food & Agricultural Organisation standards published in 1966 were apparently used in setting the New South Wales standards.

What I claim is:

1. A process for converting a molasses fermentation residue into a coagulation product comprising:
   a. concentrating said molasses fermentation residue to a solids level of from about 60 to about 80 weight percent thereof;
   b. heating the concentrated residue to about its boiling point to induce thickening thereof;
   c. cooling the concentrated residue to about 80°C.;
   d. admixing up to about 15 percent by weight, based upon the concentrated residue, of a soluble phosphate to form a resultant mixture;
   e. heating said resultant mixture to a temperature of from about 105° to 120°C until coagulation thereof is obtained; and,
   f. recovering the coagulation product.

2. The process of claim 1 wherein said soluble phosphate material is selected from phosphoric acid, ammonium phosphates and superphosphates.

3. The process of claim 2 wherein said superphosphates are selected from single, double and triple superphosphates.

4. The process of claim 2 wherein said ammonium phosphate is monoammonium phosphate.

5. The process of claim 1 further comprising drying the resulting coagulated product to form a friable non-hygroscopic solid.

6. The process of claim 5 further comprising granulating said friable non-hygroscopic solid.

7. The process of claim 5 further comprising grinding said friable non-hygroscopic solid to a powder form.

* * * * *